June 17, 1930.    M. O. JUNG    1,765,076
MOUNTAIN CLIMBING PICK
Filed June 24, 1927
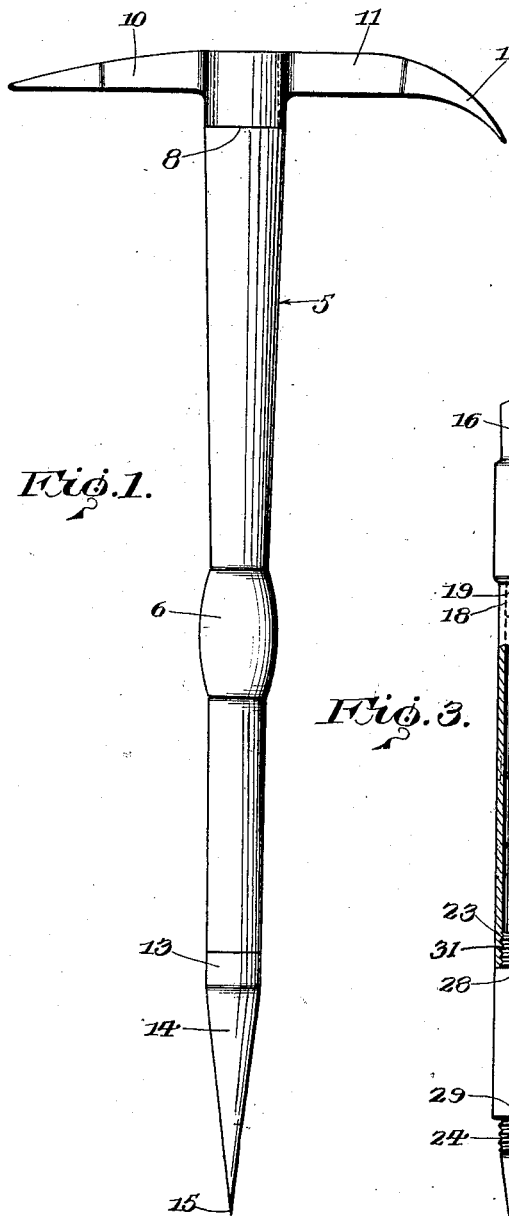
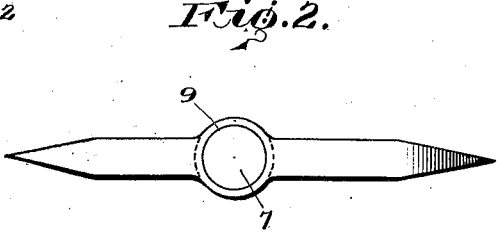
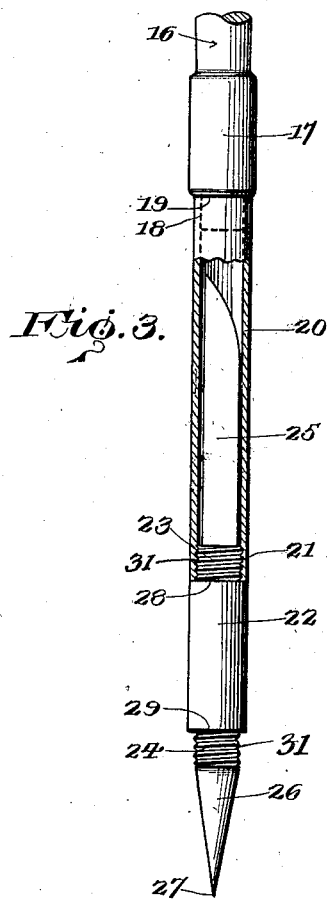
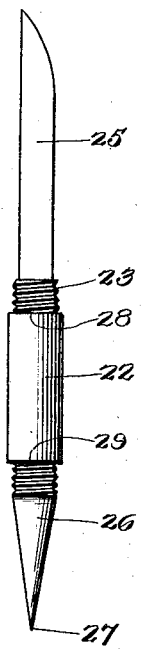
INVENTOR.
Manner O. Jung,
BY
Geo. F. Kimmel  ATTORNEY.

Patented June 17, 1930

1,765,076

UNITED STATES PATENT OFFICE

MANNER O. JUNG, OF BOULDER, COLORADO

MOUNTAIN-CLIMBING PICK

Application filed June 24, 1927. Serial No. 201,252.

This invention relates to a pick designed primarily for use by mountain climbers, and has for its object to provide, in a manner as hereinafter set forth, a device of such class so constructed and arranged as materially to assist a climber when making an ascent or descent, especially on difficult rock climbs or where there is dangerous ice, and further providing, when used, a safeguard for the climber as well as to readily make a clearance for passage when desired.

Further objects of the invention are to provide, in a manner as hereinafter set forth, a pick for mountain climbers, which is simple in its construction and arrangement, strong, durable, compact, thoroughly efficient and convenient in its use, readily assembled, and comparatively inexpensive to manufacture.

With the foregoing and other objects in view the invention consists of the novel construction, combination, and arrangement of parts as hereinafter more specifically described, and illustrated in the accompanying drawings, wherein is shown an embodiment of the invention; but it is to be understood that changes, variations, and modifications can be resorted to which fall within the scope of the claim hereunto appended.

In the drawings wherein like reference characters denote corresponding parts throughout the several views:

Fig. 1 is a side elevation of a pick, for the purpose set forth and in accordance with this invention;

Fig. 2 is a plan thereof;

Fig. 3 is a fragmentary view, partly in section, of a modified form; and

Fig. 4 is an elevation of the combined knife and pike forming a part of the modified form shown in Fig. 3.

Referring to Figs. 1 and 2 of the drawings, 5 generally indicates a handle of substantial length and constructed of any suitable hard wood. The handle 5 is tapered for a portion of its length and provided intermediate its ends with an enlargement 6 to constitute a grip. The forward end of the handle 5 is reduced, as indicated at 7 and which provides a shoulder 8. Secured to the reduced end 7 of the handle 5, as well as abutting the shoulder 8, is a sleeve 9 having formed integral therewith a right-angularly disposed pick member 10 and a right-angularly disposed hook member 11. The members 10 and 11 extend in opposite directions with respect to each other and are flush with the outer end of the collar 9 and spaced adjacent the other end of the collar 9. The hooked portion of the hook member 11 is indicated at 12 and which is inturned.

Suitably secured to the rear end of the handle 5 is a pike 13 having the major portion thereof, which is indicated at 14, tapered to a point 15. The tapered portion 14 is arranged outwardly with respect to the remaining part of the pike 13 and is of materially greater length than said remaining part. The pike 13 can be of any desired length and is constructed of metallic material.

That part of the handle 5 extending from the rear end thereof to the grip 6 is of uniform circumference throughout and the grip 6 merges at its respective ends into the uniform circumference and tapered portions of the handle. The maximum circumference of the grip 6 is greater than the circumference of the uniform circumference portion and is also greater than the minimum circumference of the tapered portion but is less than the maximum circumference of the latter.

The modified form shown in Figs. 3 and 4, includes a handle member 16, provided with an enlargement 17 to constitute a hand grip and further formed with a reduced end 18 which provides a shoulder 19. That part of the handle member 16, not shown in Fig. 3, and which extends from the hand grip 17 is constructed in the same manner as that shown in Fig. 1 and provided with the sleeve 9 and the oppositely extending pick and hook members.

Secured to the reduced end 18 of the handle 16 and abutting against the shoulder 19 is a sleeve 20 of substantial length and formed on its inner face, at its outer end, with threads 21.

Associated with the sleeve 20, is a combined pike and knife carrying element consisting of a cylindrical body portion 22, corresponding in diameter to the outer diameter of the sleeve 20 and formed at each end with a reduced peripheral threaded terminal portion. The reduced terminal portion at one end of the body portion 22 is indicated at 23 and the reduced terminal at the other end of the body portion 22 is indicated at 24. Connected with or formed integral with the reduced terminal portion 23 is a knife or cutter 25 of substantial length, and formed integral with the reduced terminal 24 is a pike 26 of substantial length and tapered from end to end to provide a point 27. The threads 21 are for selective engagement with the reduced terminals 23, 24. The cutter or knife 25 can also be employed as a pike if desired, but preferably it is used for cutting purposes. The providing of the combined pike and cutter elements with the reduced terminals 23, 24 form shoulders 28, 29. The former abuts against the outer end of the sleeve 20 when the terminal portion 23 threadedly engages with the threads 21 and the latter abuts against the outer end of the sleeve 20 when the terminal 24 engages with the threads 21.

The providing of the pick with a pick member, a hook member, a pike, and a cutter will materially assist one during an ascent or descent, as well as providing a safeguard for the user, and therefore it is thought the many advantages of a pick for mountain climbers, in accordance with this invention, can be readily understood, and although the preferred embodiment of the invention is as illustrated and described, yet it is to be understood that changes in the details of construction can be had which fall within the scope of the invention as claimed.

What I claim is:

A pike for mountain climbers including a handle member and a pike element secured to one end thereof, said handle member being formed intermediate its ends with a grip portion of varying circumference and further formed with a tapered portion extending from a point adjacent the forward end thereof to one end of said grip portion, said grip portion having its peripheral face formed in continuation of the peripheral face of the handle and further having a maximum circumference greater than the circumference of the handle at the points of mergence between the handle and grip portion.

In testimony whereof, I affix my signature hereto.

MANNER O. JUNG.